United States Patent
Endres et al.

(10) Patent No.: US 10,336,123 B2
(45) Date of Patent: Jul. 2, 2019

(54) MULTILAYER SECURITY ELEMENT

(71) Applicant: GIESECKE+DEVRIENT MOBILE SECURITY GMBH, München (DE)

(72) Inventors: Günter Endres, München (DE); Klaus Kohl, Miesbach (DE); Tobias Rosati, München (DE)

(73) Assignee: GIESECKE+DEVRIENT MOBILE SECURITY GMBH, Munich (DE)

( * ) Notice: Subject to any disclaimer, the term of this patent is extended or adjusted under 35 U.S.C. 154(b) by 0 days.

(21) Appl. No.: 15/568,308

(22) PCT Filed: Apr. 20, 2016

(86) PCT No.: PCT/EP2016/000641
§ 371 (c)(1),
(2) Date: Oct. 20, 2017

(87) PCT Pub. No.: WO2016/169650
PCT Pub. Date: Oct. 27, 2016

(65) Prior Publication Data
US 2018/0147881 A1   May 31, 2018

(30) Foreign Application Priority Data
Apr. 21, 2015   (DE) ........................ 10 2015 005 082

(51) Int. Cl.
*B32B 27/06* (2006.01)
*B32B 27/36* (2006.01)
(Continued)

(52) U.S. Cl.
CPC ............ *B42D 25/351* (2014.10); *B32B 27/08* (2013.01); *B32B 27/365* (2013.01); *B32B 37/14* (2013.01);
(Continued)

(58) Field of Classification Search
CPC .......... Y10T 428/24331; B42D 25/351; B42D 25/23; B42D 25/45; B42D 25/30; B32B 27/08; B32B 27/365; B32B 2307/41
See application file for complete search history.

(56) References Cited

U.S. PATENT DOCUMENTS

| 4,766,026 A | 8/1988 | Lass et al. |
| 4,894,110 A | 1/1990 | Lass et al. |

(Continued)

FOREIGN PATENT DOCUMENTS

| DE | 102008013073 A1 | 9/2009 |
| EP | 0219011 A2 | 4/1987 |

(Continued)

OTHER PUBLICATIONS

International Search Report from PCT Application No. PCT/EP2016/000641, dated Jul. 12, 2016.
(Continued)

*Primary Examiner* — Joanna Pleszczynska
(74) *Attorney, Agent, or Firm* — Workman Nydegger

(57) ABSTRACT

An easily manufacturable multilayer security element has an opaque functional layer that is arranged between two build-up layers of transmissive material. The opaque functional layer has at least one cutout. The layers are connected by lamination to form an areal body with planar surfaces. The cutout is filled up with transmissive material of the build-up layers. One build-up layer supports a feature carrier layer. A security feature, which is arranged at least partially below the cutout, is formed in the feature carrier layer and/or between the functional layer and the feature carrier layer. The cutout forms an inner window through which the security feature is recognizable.

15 Claims, 3 Drawing Sheets

(51) Int. Cl.
*B42D 25/30* (2014.01)
*B42D 25/351* (2014.01)
*B42D 25/23* (2014.01)
*B42D 25/45* (2014.01)
*B42D 25/324* (2014.01)
*B42D 25/328* (2014.01)
*B42D 25/24* (2014.01)
*B42D 25/378* (2014.01)
*B32B 27/08* (2006.01)
*B32B 37/14* (2006.01)
*B42D 25/355* (2014.01)

(52) U.S. Cl.
CPC ............ *B42D 25/23* (2014.10); *B42D 25/24* (2014.10); *B42D 25/324* (2014.10); *B42D 25/328* (2014.10); *B42D 25/378* (2014.10); *B42D 25/45* (2014.10); *B32B 2307/41* (2013.01); *B32B 2309/105* (2013.01); *B42D 25/355* (2014.10)

(56) References Cited

U.S. PATENT DOCUMENTS

| | | | | |
|---|---|---|---|---|
| 6,210,777 | B1* | 4/2001 | Vermeulen | B41M 3/14 283/72 |
| 7,654,581 | B2* | 2/2010 | Cruikshank | B42D 25/29 283/107 |
| 8,720,951 | B2 | 5/2014 | Brehm et al. | |
| 8,982,231 | B2* | 3/2015 | Vincent | B42D 25/351 348/222.1 |
| 9,463,659 | B2 | 10/2016 | Brehm et al. | |
| 2011/0003166 | A1 | 1/2011 | Brehm et al. | |
| 2013/0344298 | A1* | 12/2013 | Haas | B41M 5/267 428/195.1 |
| 2014/0205852 | A1 | 7/2014 | Brehm et al. | |
| 2015/0085285 | A1* | 3/2015 | Jones | B32B 3/266 356/432 |
| 2016/0375714 | A1 | 12/2016 | Brehm et al. | |

FOREIGN PATENT DOCUMENTS

| | | |
|---|---|---|
| EP | 1643420 A1 | 4/2006 |
| EP | 1719637 A2 | 11/2006 |
| EP | 2028017 A2 | 2/2009 |
| EP | 2275279 A1 | 1/2011 |
| EP | 2559563 A1 | 2/2013 |
| FR | 3007318 A1 | 12/2014 |

OTHER PUBLICATIONS

German Search Report from DE Application No. 102015005082.6, dated Mar. 3, 2016.

* cited by examiner

MULTILAYER SECURITY ELEMENT

BACKGROUND

The invention relates to a multilayer security element that can be used among other things as a data page or as an identification card. In particular, the invention relates to a multilayer security element in the form of an areal body having at least one transparent or translucent region. The region can be a window. The invention further relates to a method for manufacturing a security element.

A generic security element in the form of an identification card is known from EP 2 275 279 A1. The identity document described is built up from several layers, two outer layers and a central layer, which are connected by lamination to form an areal body. The outer layers consist of a transparent material, the central layer of an opaque one. In the central layer a recess is disposed into which a window element is inserted in exact register. The window element is configured to make a hidden information item visible. The known solution is effective, but also elaborate to manufacture. In particular, the fitting of the window element in exact register in the central layer is challenging with regard to manufacturing technology. The known solution therefore is usually not suitable for example when a cost-effective card-shaped security element is to be equipped with a translucent or transparent region.

From EP 1 719 637 A2 a multilayer security document with a window is known, in which security elements are arranged. The security document comprises an opaque core layer, a transparent, UV-non-transmissive layer and two transparent protective layers. From the core layer, a recess is punched out which forms the window in the finished security document. The layers are interconnected by application of heat and pressure. The security elements are configured as a printed pattern of UV-fluorescent ink on both sides of the UV-non-transmissive layer. When the security document is exposed to UV light with an upper side, a viewer recognizes in the window the printed pattern of the security element facing him on the UV-non-transmissive layer. When both upper sides of the security document are exposed to UV light simultaneously, a viewer recognizes simultaneously in the window the printed patterns of both security elements placed on both sides of the UV-non-transmissive layer. The known solution is based on the possibility of making two actually separate printed security elements visible simultaneously. This implies that the security document has a window. The solution is not suitable for security elements that are opaque over the full area.

SUMMARY

The object of the present invention is to specify a security element employable as identification card or data page that has a security feature and a transparent or translucent region and is easy to manufacture.

The security element according to the invention is characterized by an excellent planarity of its surfaces, without requiring any particular, challenging process steps for its manufacture. A further advantage is that inner windows, in whose inspection regions security features are formed, can be created in simple fashion in an otherwise opaque areal body. With a corresponding arrangement, the security features are perceived clearly in different depth positions. The impression of a different depth position is supported by the security features being formed on or in a layer that is arranged below the opaque layer defining the inner window with the interposition of a transparent functional layer.

The inner windows here can have edge contours of almost any desired design. This is achieved by not effecting the formation of transparent or transmissive regions by making available transparent or transmissive material specially provided for this purpose, but during lamination, by filling up cutouts with material of the adjoining transmissive build-up layers.

Particularly good results are achieved when the material of the functional layers has a thickness of less than 100 µm. Further, it is particularly advantageous when polycarbonate is chosen as the material for the build-up layers or a material consisting substantially of polycarbonate. Particularly advantageously, the multilayer security element has two opaque functional layers disposed mutually opposite with the interposition of a feature carrier layer. On the feature carrier layer security features are formed which can be viewed from both sides. Advantageously, different perceptions can be realized thereby. In a particularly expedient embodiment, the cutouts are arranged in the functional layers such that they are placed along a line, but do not overlap. When a feature carrier layer is additionally arranged between the functional layers, the effect of a security thread, as known from banknotes, can be achieved advantageously.

BRIEF DESCRIPTION OF THE DRAWINGS

Embodiments of the invention will hereinafter be explained in more detail with reference to the drawing. There are shown.

DETAILED DESCRIPTION OF VARIOUS EMBODIMENTS

Figure 1A:
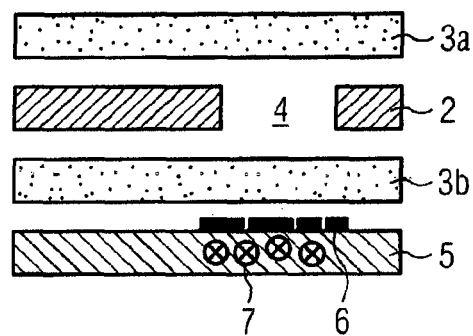
FIGS. 1a-1c in cross section the basic principle of the structure of a security element, FIGS. 2a-2d in cross-section variants of a security element with further build-up layers and further security features, FIG. 3 in cross section a security element with two functional layers which reproduce a security thread, and FIG. 4 in cross-section a security element with two inner windows disposed partly mutually opposite.
Figure 1B:
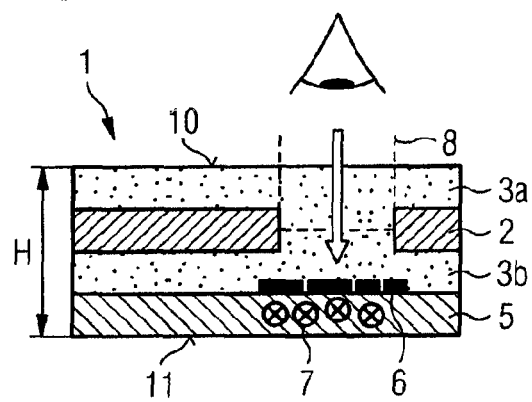
Figure 1C:
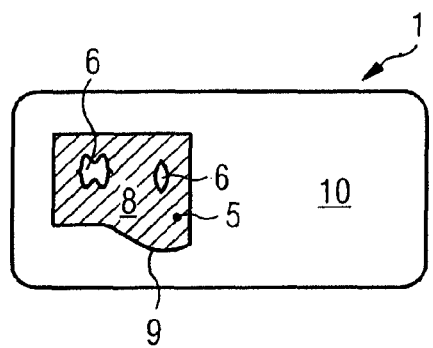

FIG. 1 illustrates the principal basic structure of a security element 1, FIG. 1a shows in exploded view a state before the lamination, FIG. 1b the state after lamination, FIG. 1c is a plan view of a security element, onto the side having the inner window. The basic structure consists of a functional layer 2, which is arranged between two build-up layers 3a, 3b. Below the build-up layer 3b a feature carrier layer 5 is arranged. The build-up layers 3a, 3b consist of a transmissive material, i.e. of a transparent or translucent material, or in other words: of a material which is transparent to milky to the human eye, but not completely opaque. The functional layer 2 consists of an opaque material or at least of a material that is less transmissive than the build-up layers 3a, 3b. The feature carrier layer 5 likewise consists of an opaque material or a material that is at least less transmissive than the build-up layers 3a, 3b.

A cutout 4 is formed in the functional layer 2. It defines an inner window 8 in the finished security element 1. The cutout 4 is completely filled with material of the build-up layers 3a, 3b.

On the feature carrier layer 5 at least one security feature 6, 7 is formed, which extends at least partially into the area of the cutout 4. This means that the security feature 6, 7 is disposed completely or partially in the inspection region of the inner window 8. The formation of the security feature 6, 7 preferably takes place prior to connecting the feature carrier layer 5 with the other layers.

The security feature 6, 7 can be a superficially applied security feature 6, for example in the form of a printed pattern, or in the form of physical elements, such as a hologram. Alternatively or additionally, the feature layer 5 can contain embedded security features 7, for example ink particles or fluorescent elements.

In addition to the above-mentioned ones, any other known security features can be realized in or on the feature carrier layer 5. For example, such features can be considered that become visible only following excitation with electromagnetic radiation, or features which are realized by deforming the feature carrier layer 5. Also, some security features can be produced only after the lamination, for example by lasering. Further, it is possible without difficulty to form the feature carrier layer 5 in the form of a multilayer structure with several individual layers bearing different security features. The same or different security features 6, 7 can further also be formed outside of the inner window 8.

A security feature can also already be constituted by the properties of the feature carrier layer 5, in particular by its inherent color or surface properties. In a very simple and inexpensive variant, special, additionally introduced security features 6, 7 can be omitted and a security feature can be formed merely by the properties of the feature carrier layer 5.

Since they are disposed in the area of the cutout 4, a viewer can recognize the security features 6, 7 in perpendicular plan view of the security element 1—as indicated in FIG. 1b.

The layers 2, 3a, 3b and 5 are usually made available in the form of foils. The foils are interconnected by lamination to form an areal body, the shape of which is determined by an upper and a lower surface 10, 11 and which has a thickness that is small in comparison to the size of the surfaces 10, 11. The surfaces 10, 11 are planar and are usually disposed plane-parallel to one another.

FIG. 1a shows an exploded view of the layers 2, 3a, 3b, 5 of a basic structure before lamination, FIG. 1b an areal body with planar surfaces 10, 11 produced therefrom by lamination. The areal body forms the body of the security element 1. During lamination material of the build-up layers 3a, 3b flows into the cutout 4 and fills it up completely. When the build-up layers 3a, 3b consist of a transparent material and the functional layer 2 of an opaque material, the finished security element 1 in its basic structure thus has an inner window 8, which a viewer—as indicated in FIG. 1b—can easily recognize when viewing the surface 10 of the side of the security element 1 containing the inner window 8 in perpendicular plan view. The lamination is effected with usual parameters.

The functional layer 2 can have several cutouts 4. Each cutout 4 is limited by an edge contour 9. The geometry of the cutouts 4 can be freely selected within a wide range. The edge contour 9 of a cutout 4 can consist of sections of polygonal curves, contain curve sections with curves in different radii and/or have angles with different opening angles.

FIG. 1c shows a plan view of the side of the security element 1 having the inner window 8. The designs shown are merely exemplary and are not to be understood as limiting in any fashion. The plan view illustrates the free configurability of the geometry of the cutouts 4 and of the inner windows 8 resulting therefrom. These can have freely formed edge contours 9, as indicated. In the inner windows 8 security features 6 are recognizable which are printed patterns in the example of FIG. 1c. The field of view of a viewer in a plan view of the inner window 8 is limited in depth by the feature carrier layer 5.

The thickness of the functional layer 2 is expediently below 125 μm, preferably below 100 μm. Larger thicknesses are nevertheless possible. The thickness of the build-up layers 3 can be freely selected within a wide range. Typically, it is between 50 and 500 μm for a single build-up layer 3a, 3b. The thickness of the build-up layers 3 adjoining a functional layer 2 with cutout 4 is expediently chosen so that the build-up layers 3 make available sufficient material to fill the cutouts 4, without leading to an undesirable reduction of the thickness of the build-up layer 3. The thickness of the feature carrier layer 5 typically corresponds to the thickness of a build-up layer and is between 50 and 500 μm. The total thickness H of a security element 1 is typically between 300 and 1000 μm.

The material of the functional layer 2 is preferably polycarbonate. Alternatively, blends of polycarbonate with other plastics can optionally be considered. Additives can be admixed to the polycarbonate to improve the material properties or the material behavior. Additives can serve for example to raise the softening temperature during lamination or to suppress shrinkage of the material.

Likewise, the build-up layers 3a, 3b preferably consist of polycarbonate; also blends of polycarbonate with other plastics can optionally be considered in turn. Additives can be admixed to the polycarbonate likewise in order to improve the material properties or the material behavior. Expediently, the build-up layers 3a, 3b further consist of the same material. In variants, it is also conceivable that the build-up layers 3a, 3b consist of different materials. It can be provided that only one of the materials flows into and fills up the cutouts 4 during lamination.

The feature carrier layer 5 expediently likewise consists of polycarbonate.

Functional layers 2 and build-up layers 3 are typically made available in the form of foils which are flexible before lamination. During lamination, the functional layers 2 and the build-up layers 3 bond to form a relatively rigid areal body, however which nevertheless has sufficient bending elasticity. Expediently, the areal body meets the physical requirements that can be gathered from the relevant standards, for example from ISO 7810, which is relevant for chip cards.

During lamination a slight shrinkage of the geometries of the cutouts 4 occurs in some cases. Corners and acute angles are typically preserved therein. The shrinkage has to be considered in the design of the cutouts 4. Typically, the shrinkage amounts to 2 to 10%.

Proceeding from the basic structure illustrated in FIG. 1, a security element 1 can contain further functional layers 2 and build-up layers 3, as well as further layers of other types. The layers or the areal body can additionally be equipped with security features such as printed patterns or foreign substances or bear construction components, in particular optical and/or electronic construction components.

The security element 1 can in particular have a standard card format and can be an identification card, a bank card, a credit card or a chip card, for example. Likewise, the security element 1 can be a SIM card, a data page for a passport book, a token or a key pendant. The shape of the security element 1 here is not restricted to the basic shape of a rectangle, but can have any other geometry, and can have for example a drop shape, a triangular shape or the shape of an alphanumeric character.

FIG. 2 illustrates embodiments of a security element 1 in which the security element has further build-up layers in addition to the layers 3a, 2, 3b, 5 of a basic structure.

Figure 2A:
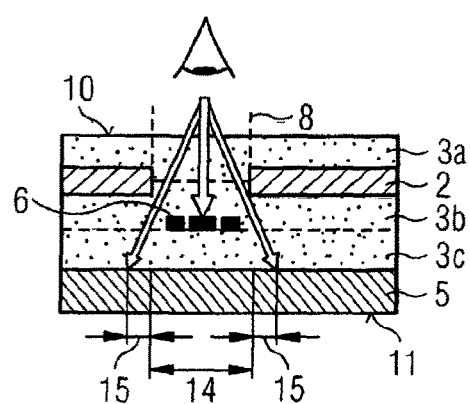

FIG. 2a shows a variant which corresponds in principle to the basic structure of FIG. 1. Unlike said basic structure, here a further, third build-up layer 3c is arranged between the functional layer 2 and the feature carrier layer 5 such that it adjoins the build-up layer 3b of the basic structure. Between the functional layer 2 and the feature carrier layer 5 two build-up layers 3b, 3c are thus arranged in mutually adjoining fashion. In the plane between the further build-up layer 3c and the adjoining build-up layer 3b a security feature 6 is formed, which, as indicated in FIG. 2a, can for example have the form of a printed pattern. The security feature 6 is formed on the lower side of the build-up layer 3b or on the upper side of the third build-up layer 3c in technically expedient fashion. It can also be realized within one of the build-up layers.

When a viewer—as indicated in FIG. 2a—views the security element 1 from above from the side containing the inner window 8, he clearly recognizes through the inner window 8 the printed pattern 6 in the inspection region 14 determined by the inner window 8. The field of view of the viewer is limited by the feature carrier layer 5. It includes—as indicated in FIG. 2a—a covered region 15, which is disposed below the functional layer 2. The covered region 15 appears as shading, forming a frame around the openly inspectable region disposed in the inner window 8. Through the perceived shading the viewer is given the impression that the open inspection region 14 on the functional layer 2 is disposed much deeper below the opaque functional layer 2 than this is the case in reality.

Figure 2B:
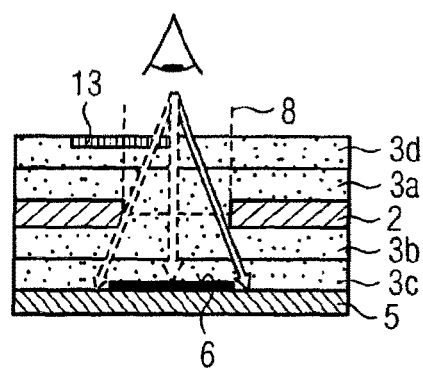
Figure 2C:
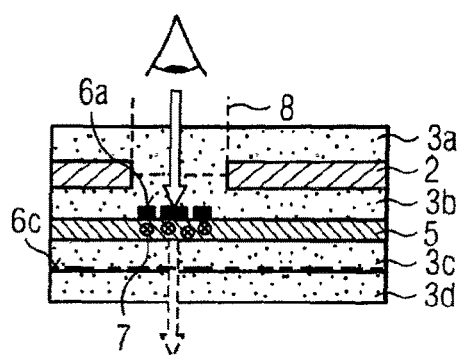
Figure 2D:
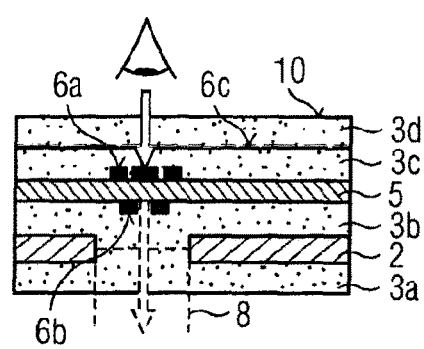
Figure 3:
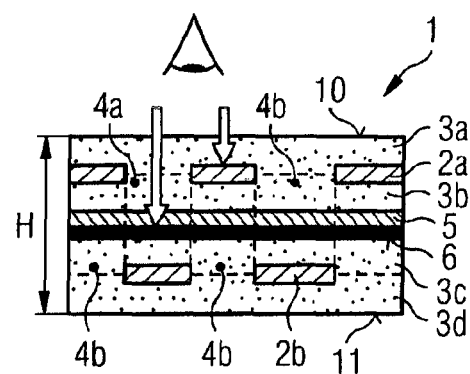

The effect of a great depth caused by the shading occurs in the same fashion also in the other embodiments according to FIGS. 1 to 3; it is not represented there for reasons of clarity.

FIG. 2b shows a variant in which a first additional build-up layer 3c is arranged between the feature carrier layer 5 and the functional layer 2 and a second additional build-up layer 3d is arranged on the side of the functional layer 2 that faces away. On the feature carrier layer 5, a security feature is formed in the form of a printed pattern 6. In the second additional build-up layer 3d a further security feature 13 is formed, for example a hologram or a printed pattern, which is disposed partially in the inner window 8 in the example of FIG. 2b.

To a viewer viewing the security element 1 in perpendicular plan view—as indicated in FIG. 2b—the inner window 8 appears as a recess in the embodiment example represented in FIG. 2b. In the inner window 8, the viewer recognizes the further security feature 13 and further the printed pattern 6. Both overlap, wherein the different depth position is perceived. The perception of the different depth position is reinforced by the perception of shading. The shading impression, as explained with reference to FIG. 2a, is caused by the field of view of the viewer, which, as indicated by arrows, encompasses both such regions which are below the further security feature 13 and such regions which are disposed below the functional layer 2.

The embodiment according to FIG. 2b can be combined with the embodiment of FIG. 2a and likewise with the other embodiments.

In FIG. 2c two further build-up layers 3c, 3d are arranged on the side of the feature carrier layer 5 that faces away. The functional layer 2 is opaque and has cutouts 4. The feature carrier layer 5 in this case, unlike in the basic structure of FIG. 1, is not completely opaque, but translucent. This means that the feature carrier layer 5 has a lower opacity than the functional layer 2 and is translucent. Above the feature carrier layer 5 two further build-up layers 3c, 3d are disposed one above the other. The build-up layer 3d constitutes the planar upper side 10 of the security element 1. The additional build-up layers 3c, 3d expediently consist of the same material as the build-up layers 3a, 3b and are transparent like said layer. The feature carrier layer 5 is equipped with a printed pattern 6a, 6b, which is disposed in the inspection region of the inner window 8 formed by the cutout 4. The printed pattern 6a, 6b, as indicated in FIG. 3, can be formed on both sides of the feature carrier layer 5.

Further, on the upper side of the build-up layer 3c adjoining the feature carrier layer 5, a further security feature is formed, for example in the shape of a further printed pattern 6c, such as a design pattern. Instead of a printed pattern 6c or in addition thereto, a feature embedded in one or both of the build-up layers 3c, 3d can be provided.

A viewer viewing the security element 1 perpendicularly from above from the side facing away—as indicated in FIG. 2c—recognizes an inner window 8 with a translucent, thus at least slightly sheer, back side in the embodiment example illustrated in FIG. 2c. The determining factor for the translucent impression are the properties, more precisely: the opacity of the feature carrier layer 5. In the inner window 8, the viewer clearly recognizes the printed patterns 6c and 6a; the printed pattern 6b in contrast appears weakened in dependence on the opacity of the feature carrier layer 5. In this way, the impression of a different depth position of the printed patterns is brought about.

FIG. 2d shows the same basic structure as FIG. 2c in reverse arrangement. In contrast to FIG. 2c a printed pattern 6 is present on the feature carrier layer 5 only on one side; instead additional embedded features 7 are formed in the feature carrier layer 5, for example fluorescent elements.

For a viewer viewing the side of the security element 1 containing the inner window 8 perpendicularly from above—as indicated in FIG. 2d—the inner window 8 appears to be translucent in the embodiment example represented in FIG. 2d. The determining factor for the translucent impression are the properties of the feature carrier layer 5. In the inner window 8, the viewer clearly recognizes the printed pattern 6a and the embedded features 7. Corresponding to the translucency of the feature carrier layer 5, he recognizes the printed pattern 6c in weakened fashion. This, in turn, supports the impression of a different depth position.

Through the security features 6, 7 applied asymmetrically with reference to the feature carrier layer 5, different appearances result for a viewer in dependence on the side from which the security element 1 is viewed. Thus, for example in FIG. 2c the printed pattern 6c on the build-up layer 3c is readily recognizable by viewing from the upper side, while the same printed pattern 6c is poorly or not at all recognizable by viewing from the lower side. Likewise, the printed patterns 6a, 6b applied to the feature carrier layer 6 are alternately readily recognizable respectively from one side and more poorly recognizable from the opposite side. When in the variant indicated in FIG. 2d the build-up layers 3a, 3b, 3c, 3d are transparent in the same manner, the centrally formed embedded feature 7 is equally readily recognizable from both viewing sides.

The embodiments according to FIG. 2c, 2d can be combined with the other embodiments.

FIG. 3 illustrates an embodiment of a security element 1 with seven layers, which reproduces a security thread, as known from banknotes for example. The security element 1 comprises a central feature carrier layer 5, which in this case is transparent and covered with a glossy, reflective printed layer 6 over the full area on one side. In a variant, the feature carrier layer 5 itself is glossy and reflective. For this purpose, it can contain metallic particles, for example.

On both sides of the central feature carrier layer 5, a three-layer structure is disposed, consisting of two build-up layers 3a, 3b or 3c, 3d and a central functional layer 2c or 2d respectively. Both functional layers 2c, 2d are each equipped with a series of cutouts 4a, 4b. The cutouts 4a, 4b are expediently each formed at regular intervals along a line. The sequences of cutouts 4a, 4b are so mutually aligned that the cutouts in the respectively first functional layer material are disposed precisely opposite material regions in the respectively other functional layer.

When a viewer views the surface 10 of the security element 1 in perpendicular plan view—as indicated in the Fig.—he sees the full-area regions 12a in the closest functional layer 2a through the transparent build-up layer 3a on the one hand. In the cutouts 4a disposed between, he sees respectively sections of the glossy printed layer 6 formed on the feature carrier layer 5 on the other hand. These sections of the feature carrier layer 5 here are disposed clearly perceptibly at a greater depth than the full-area regions 12a of the functional layer 2.

In a variant, the printed layer 6 can be configured not to extend over the full area. In this case, a viewer viewing the security element 1 in plan view perceives also the full-area regions 12b of the functional layer 2b facing away in the cutouts 4a corresponding to the pattern of the printed layer 6. This intensifies the impression of depth.

Figure 4:
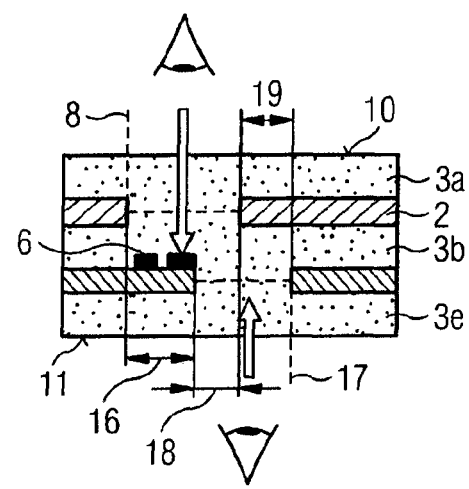

A further variant indicated in FIG. 4 is based on the basic structure according to FIG. 1. However, unlike said basic structure, the feature carrier layer 5 is likewise provided with at least one gap, and a further build-up layer 3e is arranged below the feature carrier layer 5. The further build-up layer 3e consists of the same material as the other two build-up layers 3a, 3b, i.e. it is transparent or translucent. During lamination, the material of the further build-up layer 3e together with the material of the other build-up layers 3a, 3b fills up the gap in the feature carrier layer 5 and thereby produces a second inner window 17 on the side facing away.

The gap in the feature carrier layer 5 has a different geometry than the cutout 4 in the functional layer 2. The cutout 4 and the gap in the feature carrier layer 5 overlap partially. Correspondingly, the inner windows 8, 17 are partially disposed opposite each other. Thereby different mutually adjoining regions are created in the security element 1: a see-through area 18 from the upper surface 10 to the lower surface 11, an inspection region 16 that corresponds to an inner window in accordance with the basic structure according to FIG. 1, as well as an inspection region 19 that is limited by the functional layer 2. On or in the feature carrier layer 5, security features 6, 7 can be arranged in turn. Also on the lower side of the functional layer 2—not shown—further security features can be arranged in the region that can be inspected through the inner window 17.

The embodiment variant indicated in FIG. 4 yields a security element 1 which, as indicated in FIG. 4, shows a viewer inner windows 8, 17 that are geometrically different from the two viewing sides. The inner windows 8, 17 also yield different views: in the inner windows 8 the security features 6, 7 can be recognized, in the inner window 17, in its inspection region 19, the lower side of the functional layer 2. The functional layer 2 can likewise bear security features which expediently differ from the security features 6, 7 arranged in the inspection region 16 of the inner window 8.

The inspection regions 16, 19, in which the functional layer 2 and the feature layer 5 do not overlap, additionally appear to be less opaque when viewed against backlighting in comparison to the surrounding regions in which the functional layer 2 and the feature layer 5 overlap. The different transparency against backlighting constitutes a further characteristic feature of the security element 1.

While retaining the basic idea of creating inner windows 8 in a multilayer structure by equipping a central functional layer 2 with cutouts 4 which are filled up during lamination by material of the adjoining build-up layers 3a, 3b, and of further providing a feature carrier layer 5 bearing security features 6, 7 in the inspection region of the window 8, the invention permits a number of further variants that are not explained in detail here. Above all, all embodiments and embodiment elements shown in the figures can be combined in fundamentally any way. When the invention is used in an identity card for example, several embodiments can be realized side by side in the same card. Fundamentally, there is no limitation with regard to the number of sets of functional layers and build-up layers arranged one above the other and/or the number of basic structures arranged one above the other. In particular, by introducing further transparent build-up layers, further levels can be produced in a security element in targeted fashion, on which security features can be formed. Through suitably combining layer sequences in corresponding materials a multiplicity of see-through and depth effects can be produced. In particular, different see-through or depth effects can be realized on the same security element 1. Further, it is of course possible to equip a security element 1 with inner windows 8 with further features after its completion, which can in particular be arranged also or above in the inner windows. Examples of such features are for example personalization or individualization information items. For the individual layers 2, 3a, 3b, 5, further also other materials, in particular materials known for the production of cards can be used. However, when other materials are used, it may be required to provide inserts in the cutouts 4 to ensure that the finished security element 1 has planar surfaces 10, 11. In experiments, employing inserts has proven expedient when PVC is employed.

LIST OF REFERENCE NUMERALS

1. Security element
2. Functional layer(s)
3. Build-up layer(s)
4. Cutout(s)
5. Feature carrier layer
6. Printed pattern
7. Embedded feature
8. Window
9. Edge contour
10. Upper surface
11. Lower surface
12. Full-area region of a functional layer
13. Further security feature
14. Open inspection region
15. Covered region
16. Inspection region
17. Inner window
18. See-through region
19. Inspection region

The invention claimed is:

1. A multi-layer security element comprising:
    an opaque functional layer arranged between a first build-up layer and a second build-up layer, the first build-up layer and the second build-up layer being formed of a transmissive material,
    wherein the opaque functional layer, the first build-up layer, and the second build-up layer are connected by lamination to form an areal body with planar surfaces,
    wherein the opaque functional layer has at least one cutout and the at least one cutout is filled with the transmissive material of the first build-up layer and/or the second build-up layer,
    wherein on one of the first build-up layer or the second build-up layer there is further arranged a feature carrier layer, the feature carrier layer including an opaque material, and
    wherein, in the feature carrier layer and/or between the feature carrier layer and the opaque functional layer, one or more security features are formed which extend at least partially into the area of the at least one cutout.

2. The multilayer security element according to claim 1, wherein between the opaque functional layer and the feature carrier layer, there is arranged a third build-up layer of transmissive material which adjoins the first build-up layer or the second build-up layer, and at least one of the one or more security features is arranged between the third build-up layer and the first build-up layer or the second build-up layer.

3. The multilayer security element according to claim 1, wherein the opaque functional layer has a thickness of less than 150 μm.

4. The multilayer security element according to claim 1, wherein the first and/or second build-up layers consist completely or substantially of polycarbonate.

5. The multilayer security element according to claim 1, further comprising a third build-up layer of transmissive material, and a second opaque functional layer and the second opaque functional layer has at least one cutout.

6. The multilayer security element according to claim 5, wherein the third build-up layer and the second opaque functional layer are arranged on an opposite side of the feature carrier layer than the first build-up layer and the second build-up layer.

7. The multilayer security element according to claim 5, wherein the positions of the cutout in the opaque functional layer and the cutout in the second opaque functional layer are arranged offset from one another without overlap.

8. The multilayer security element according to claim 1, further comprising a third build-up layer on an opposite side from the feature carrier layer than the first build-up layer and the second build-up layer and on a side of the third build-up layer facing away from the feature carrier layer a fourth transmissive build-up layer is arranged and a second security feature is formed between the third build-up layer and the fourth build-up layer.

9. The multilayer security element according to claim 1, further comprising a third build-up layer, and a second security feature is formed on or in the third build-up layer that extends at least partially over the area of the cutout.

10. The multilayer security element according to claim 1, wherein at least one of the first build-up layer or the second build-up layer consists of a transparent material.

11. The multilayer security element according to claim 1, wherein the feature carrier layer is provided with at least one gap, and below the feature carrier layer there is arranged a third build-up layer of a transmissive material, wherein the at least one gap is filled up with transmissive material of the build-up layers.

12. The multi-layer security element according to claim 1, wherein the first build-up layer presents a planar surface toward a viewing side from which a viewer would view the multi-layer security element, the first build-up layer and the opaque functional layer each being closer to the viewing side than the second build-up layer, and
    the feature carrier layer is arranged on a side of the second build-up layer that is opposite from the viewing side.

13. The multi-layer security element according to claim 12, wherein at least a portion of the second build-up layer is arranged between the one or more security features and the opaque functional layer.

14. The multi-layer security element according to claim 1, wherein the one or more security features are formed in the feature carrier layer.

15. The multi-layer security element according to claim 1, wherein the one or more security features are formed between the feature carrier layer and the opaque functional layer.

* * * * *